(12) United States Patent
Sato

(10) Patent No.: US 12,477,210 B2
(45) Date of Patent: Nov. 18, 2025

(54) IMAGING DEVICE AND CONTROL METHOD OF IMAGING DEVICE

(71) Applicant: CANON KABUSHIKI KAISHA, Tokyo (JP)

(72) Inventor: Ayumi Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 18/505,338

(22) Filed: Nov. 9, 2023

(65) Prior Publication Data

US 2024/0163545 A1 May 16, 2024

(30) Foreign Application Priority Data

Nov. 14, 2022 (JP) .................................. 2022-181608

(51) Int. Cl.
*H04N 23/62* (2023.01)
*H04N 23/63* (2023.01)
*H04N 23/667* (2023.01)

(52) U.S. Cl.
CPC ........... *H04N 23/62* (2023.01); *H04N 23/633* (2023.01); *H04N 23/667* (2023.01)

(58) Field of Classification Search
CPC .... H04N 23/62; H04N 23/631; H04N 23/633; H04N 23/667
See application file for complete search history.

(56) References Cited

U.S. PATENT DOCUMENTS

| | | | |
|---|---|---|---|
| 2006/0216016 A1* | 9/2006 | Eun ...................... | H04N 23/631 396/222 |
| 2017/0366718 A1* | 12/2017 | Ramprasad ............ | H04N 23/62 |
| 2019/0098213 A1 | 3/2019 | Kim | |
| 2019/0191086 A1* | 6/2019 | Kunishige ............ | H04N 23/617 |
| 2022/0086349 A1* | 3/2022 | Tadano ................ | H04N 23/632 |
| 2024/0129622 A1* | 4/2024 | Shimma ................ | H04N 23/62 |

FOREIGN PATENT DOCUMENTS

| | | |
|---|---|---|
| JP | 2014-002231 A | 1/2014 |
| WO | 2023100641 A1 | 6/2023 |

OTHER PUBLICATIONS

The above U.S. Patent Application Publication and Foreign Patent Document were cited in a United Kingdom Search Report issued on May 14, 2024, that issued in the corresponding United Kingdom Patent Application No. GB2317366.9.

* cited by examiner

*Primary Examiner* — Daniel M Pasiewicz
(74) *Attorney, Agent, or Firm* — Cowan, Liebowitz & Latman, P.C.

(57) ABSTRACT

An imaging device includes a first button to which at least one photographic setting is assigned in accordance with a user operation. The imaging device further includes switching unit which sequentially switches, each time the first button is depressed, a photographic setting to be applied to the imaging device from among a plurality of photographic settings including a photographic setting set to the imaging device and a photographic setting assigned to the first button.

8 Claims, 3 Drawing Sheets

IMAGING DEVICE AND CONTROL METHOD OF IMAGING DEVICE

BACKGROUND OF THE INVENTION

Field of the Invention

The present invention relates to an imaging device and a control method of an imaging device.

Description of the Related Art

In recent years, a function of saving a photographic setting when starting photography (recording of an image) and applying the saved photographic setting to an imaging device by a button operation during subsequent photography (reproducing the saved photographic setting with the imaging device) is known (Japanese Patent Application Laid-open No. 2014-2231).

However, with Japanese Patent Application Laid-open No. 2014-2231, while a previous photographic setting can be applied to an imaging device with a button operation, when scenes are subsequently switched, it is difficult to further appropriately switch photographic settings to be applied to the imaging device.

Therefore, conventionally, when scenes are frequently switched, there is a possibility that a user is unable to quickly change to a photographic setting matching a scene and ends up missing a photographic opportunity.

SUMMARY OF THE INVENTION

In consideration thereof, the present invention reduces the possibility of a user missing out on photographic opportunities.

An aspect of the invention is an imaging device, including: a first button to which at least one photographic setting is assigned in accordance with a user operation; and at least one memory and at least one processor which function as a switching unit configured to sequentially switch, each time the first button is depressed, a photographic setting to be applied to the imaging device from among a plurality of photographic settings including a photographic setting set to the imaging device and a photographic setting assigned to the first button.

An aspect of the invention is a control method of an imaging device including a first button to which at least one photographic setting is assigned in accordance with a user operation, the control method of an imaging device including: determining that the first button is depressed, and sequentially switching, each time the first button is depressed, a photographic setting to be applied to the imaging device from among a plurality of photographic settings including a photographic setting set to the imaging device and a photographic setting assigned to the first button.

Further features of the present invention will become apparent from the following description of embodiments with reference to the attached drawings.

DESCRIPTION OF THE EMBODIMENTS

Hereinafter, embodiments of the present invention will be described in detail with reference to the accompanying drawings. Each of the embodiments of the present invention described below can be implemented solely or as a combination of a plurality of the embodiments or features thereof where necessary or where the combination of elements or features from individual embodiments in a single embodiment is beneficial.

Figure 1:
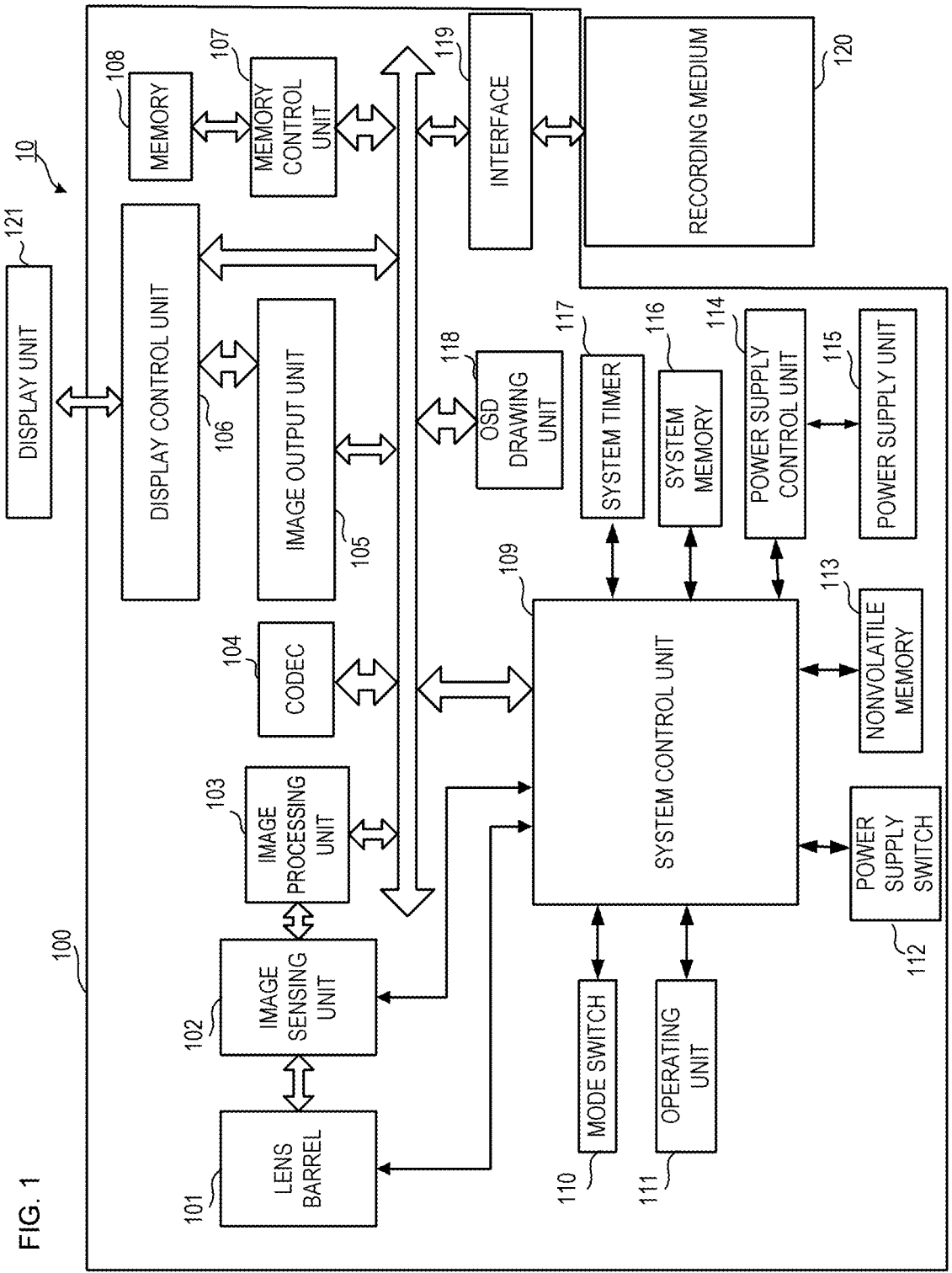
FIG. 1 is a diagram showing a configuration of a digital camera.

FIG. 1 is a block diagram showing a configuration of a digital camera 10 (an example of the imaging device) according to an embodiment. The digital camera 10 includes a housing 100, a lens barrel 101, an image sensing unit 102, an image processing unit 103, a codec 104, an image output unit 105, a display control unit 106, a memory control unit 107, a memory 108, a system control unit 109, a mode switch 110, and an operating unit 111. The digital camera 10 also includes a power supply switch 112, a nonvolatile memory 113, a power supply control unit 114, a power supply unit 115, a system memory 116, a system timer 117, an OSD drawing unit 118, an interface 119, and a recording medium 120.

The housing 100 stores the respective components included in the digital camera 10.

The lens barrel 101 has an image sensing lens (including a focusing lens and image-stabilization lens) and a diaphragm mechanism. The lens barrel 101 may be integrated with the housing 100 or may be separable from the housing 100.

The image sensing unit 102 includes an image sensor and an A/D converter (analog-digital converter). The image sensor converts an optical image condensed and formed by the image sensing lens of the lens barrel 101 into an analog electrical signal. The A/D converter converts the analog electrical signal into a digital signal (image data; video data).

The image processing unit 103 executes predetermined image processing with respect to image data acquired from the image sensing unit 102 or the memory control unit 107. Accordingly, the image processing unit 103 generates VRAM image data. The predetermined image processing refers to resizing processing, trimming processing, color conversion processing, distortion correction processing, or the like. The VRAM image data is transmitted to the memory 108 via the memory control unit 107 and stored in the memory 108.

In addition, after executing predetermined arithmetic processing with respect to the image data, the image processing unit 103 supplies the system control unit 109 with an arithmetic result. The arithmetic result is used in various types of control processing including exposure control, ranging control, and anti-vibration control. For example, AF (automatic focusing) processing, AE (automatic exposure) processing, or anti-vibration processing is executed on the basis of a result of subject detection that is an arithmetic result. The image processing unit 103 may execute AWB (automatic white balance) processing based on an arithmetic result with respect to the image data.

The codec 104 encodes, according to a predetermined video compression method (MPEG-2, H.264, or the like), the VRAM image data generated by the image processing unit 103. In addition, the codec 104 generates new VRAM image data by decoding encoded image data supplied from the memory control unit 107. The new VRAM image data is subjected to the predetermined image processing by the image processing unit 103 and subsequently supplied to the memory control unit 107.

The image output unit 105 superimposes a plurality of pieces of VRAM image data read from the memory 108 with each other and generates an image signal. The image output unit 105 can add metadata specified by the system control unit 109 to the generated image signal. The image output unit 105 can generate an individual image signal with respect to each of a plurality of display units 121.

The display control unit 106 establishes a connection to each of the display units 121 and outputs the image signal generated by the image output unit 105 to the display unit 121. The digital camera 10 and the display unit 121 can connect with each other according to, for example, the SDI (Serial Digital Interface) standard. Note that the digital camera 10 and the display unit 121 may be connected in a wired or wireless manner using other methods. For example, the digital camera 10 and the display unit 121 may be connected to each other by an HDMI (registered trademark; High-Definition Multimedia Interface) cable. In addition, image signals and signal standard information may be transmittable and receivable between the digital camera 10 and the display unit 121. Alternatively, the digital camera 10 and the display unit 121 may be connected by a wireless LAN.

The memory control unit 107 controls (adjusts) an access request with respect to the memory 108 from each component.

The memory 108 is a storage unit that stores VRAM image data handled by the image processing unit 103, the codec 104, the image output unit 105, and the OSD drawing unit 118. In addition, the memory 108 can temporarily store encoded image data output from the codec 104 and encoded image data read from the recording medium 120. The memory 108 has sufficient recording capacity for storing a predetermined time's worth of moving images and a predetermined time's worth of audio.

The system control unit 109 is a control unit that comprehensively controls the entire digital camera 10. For example, the system control unit 109 includes an arithmetic processor such as a CPU (Central Processing Unit). In addition, the system control unit 109 may have a plurality of CPU cores. The plurality of CPU cores is capable of processing, in a shared manner, a task described in a program.

The system control unit 109 expands information (variables and constants) for operation on the system memory 116 and executes a program recorded in the nonvolatile memory 113. Accordingly, the system control unit 109 controls the respective components of the digital camera 10. For example, by controlling the memory 108, the OSD drawing unit 118, and the image output unit 105, the system control unit 109 can control display (display operation) on the display unit 121 (display control).

The mode switch 110 is used to select an operating mode of the digital camera 10. For example, the mode switch 110 includes a plurality of switches and an operating mode (a camera mode, a playback mode, or the like) corresponding to a depressed switch is notified to the system control unit 109. The system control unit 109 switches to the notified operating mode.

The operating unit 111 is an operating unit that is used to input various instructions to the system control unit 109. For example, the operating unit 111 includes operating members such as a menu button, a cancel button, cross key, a SET button, a function switching button, a REC button, and an assignable button.

The menu button is a button for causing the display unit 121 to display a menu screen that enables various settings to be configured. The cross key includes an upward key, a downward key, a leftward key, and a rightward key. For example, the function switching button is a button for switching between AF and MF (manual focusing). The REC button is a button for issuing instructions to start and stop moving image recording. The assignable button is a button that enables an arbitrary function to be assigned in menu settings. Note that the assignable button may be included in an external apparatus capable of communicating with the digital camera 10 instead of being included in the digital camera 10 (operating unit 111).

A user can intuitively issue instructions related to various settings by using the cross key and the SET button in a state where the menu screen is being displayed on the display unit 121. Note that the user can issue a recording start instruction for the display unit 121 (external recording apparatus) to record an image signal or a recording stop instruction to stop recording the image signal by operations with respect to the REC button.

The power supply switch 112 is a push button for controlling a state of a power supply. The state of the power supply is switched between a power on-state and a power off-state as the user depresses the power supply switch 112.

The nonvolatile memory 113 is a recording medium to which information can be electrically recorded and from which records can be electrically erased. The nonvolatile memory 113 stores control information (programs, parameters, and the like used by the system control unit 109). The programs include a program for executing processing shown in a flow chart to be described later.

The power supply control unit 114 includes a battery detection circuit, a DC-DC converter, and a switching circuit (a circuit for switching between blocks to be energized). The power supply control unit 114 detects whether or not a battery is mounted to the power supply unit 115 and, if mounted, a type of the battery and a remaining battery level. The power supply control unit 114 controls the DC-DC converter based on a detection result and an instruction from the system control unit 109 and supplies respective components (such as the recording medium 120) with voltage necessary for operations for a necessary period of time.

The power supply unit 115 includes at least any of a primary battery (such as an alkaline battery or a lithium battery), a secondary battery (such as a NiCd battery, a NiMH battery, or a Li battery), and an AC adapter.

The system memory 116 is a volatile recording medium. For example, the system memory 116 includes a RAM (Random Access Memory). Note that the system memory 116 may be integrated (shared) with the memory 108. In this case, since access to the system memory 116 (memory 108) is to be regulated by the memory control unit 107, a small-capacity memory (such as a cache memory) that enables high-speed access may be separately provided so as to be directly coupled to the system control unit 109.

The system timer 117 is a timing generating unit that generates timing signals (synchronization signals) used in various types of control. In addition, the system timer 117 is also a time-measuring unit for measuring time of an internal clock (not illustrated). The system control unit 109 controls operations of the respective components based on the timing signals generated by the system timer 117.

The OSD drawing unit 118 (on-screen display drawing unit) provides a function (on-screen display function) of superimposing setting information on image data. In other words, the OSD drawing unit 118 superimposes (renders) information (a character string, an icon, or the like) that expresses a state and settings of the digital camera 10, various display frames, and markers with respect to the VRAM image data stored in the memory 108. The information such as a character string, an icon, or the like to be used in the on-screen display function is stored in the nonvolatile memory 113 and read by the OSD drawing unit 118 when necessary.

The interface 119 is an interface capable of connecting to the recording medium 120.

The recording medium 120 records encoded image data and accompanying data (data accompanying image data) as an image file. Encoded image data stored in the memory 108 is supplied to the recording medium 120 via the interface 119. In addition, data (image data and accompanying data) recorded in the recording medium 120 are read by the interface 119 and transferred to the memory 108. The recording medium 120 may be a medium (a memory card, an HDD, other disks, or the like) that is detachably mounted to the digital camera 10. The recording medium 120 may be a medium (flash memory, an HDD, or the like) that is built into the digital camera 10.

The display unit 121 is a display apparatus that is connected to the digital camera 10. The display unit 121 displays an image based on an image signal output from the digital camera 10. The display unit 121 may include a plurality of display apparatuses. The display unit 121 may include a display member such as a liquid crystal panel or an organic EL panel. Note that an external recording apparatus that records image signals outside of the digital camera 10 may be used instead of the display unit 121.

An operation of the digital camera 10 according to the present embodiment will be described with reference to the flow chart shown in FIG. 2. Although the operating unit 111 can include a plurality of assignable buttons, the description of the flow chart shown in FIG. 2 will be premised on the operating unit 111 including only one assignable button for the sake of brevity.

In step S201, the system control unit 109 performs initialization processing that includes processing of setting a value of a preset number N to 0. The preset number N is a number for managing a preset.

In step S202, the system control unit 109 determines whether or not a recording start operation (an operation of instructing to start recording) of a still image or a moving image has been performed (whether or not the REC button of the operating unit 111 has been operated by the user). When the system control unit 109 determines that a recording start operation has been performed, the system control unit 109 advances to step S203. When the system control unit 109 determines that a recording start operation has not been performed, the system control unit 109 advances to step S205. Note that when a recording start operation of a still image or a moving image is performed, the image sensing unit 102 performs recording (photography) of a still image or a moving image.

In step S203, the system control unit 109 increases (increments) the preset number N by one.

In step S204, the system control unit 109 acquires a present photographic setting being applied to the digital camera 10 and registers (stores) the present photographic setting in the memory 108 as an N-th preset. Note that the photographic setting may be any setting (any setting related to photography) of the digital camera 10 at the start of recording of a still image or a moving image. For example, the photographic setting includes at least one of an exposure, an ISO sensitivity, a white balance, a presence/absence of automatic focusing, a resolution, a frame rate, an operating mode, a presence/absence of flash photography, and a presence/absence of subject tracking.

In this manner, every time recording of a still image or a moving image is performed by the processing in steps S202 to S204, the system control unit 109 acquires the photographic setting during the recording as a preset (registers the photographic setting in the memory 108). Accordingly, the user can use the acquired (registered) preset in subsequent photography (recording of a still image or a moving image).

In step S205, the system control unit 109 determines whether or not an operation of an assignment setting (a setting for assigning a preset to the assignable button) has been performed by the user. For example, the user can assign a preset to the assignable button while checking an assignment setting screen (refer to FIG. 3A). When the system control unit 109 determines that an operation of assignment setting has been performed, the system control unit 109 advances to step S206. When the system control unit 109 determines that an operation of assignment setting has not been performed, the system control unit 109 advances to step S208.

In step S206, in accordance with the operation of assignment setting, the system control unit 109 assigns at least one preset registered (stored) in the memory 108 with respect to the assignable button of the operating unit 111. Note that, with respect to one assignable button, one preset may be assigned or two or more presets may be assigned. In addition, information on an assignment of a preset to the assignable button is registered in the memory 108.

In step S207, the system control unit 109 sets the preset assigned in step S206 to a locked state. In a state where an upper limit number of presets that can be registered (can be stored) in the memory 108 are being saved, a preset in a locked state is not deleted (overwritten) even when attempting to register a new preset to the memory 108. In other words, a preset assigned to the assignable button among the presets registered in the memory 108 is controlled so that a change (deletion or editing) cannot be performed. Accordingly, the user can be prevented from deleting a preset from the memory 108 and editing the preset by mistake.

Note that when a preset assigned to the assignable button is unassigned from the assignable button, the locked state of the preset is released.

In step S208, the system control unit 109 determines whether or not the assignable button of the operating unit 111 has been operated (depressed) by the user. When the system control unit 109 determines that the assignable button has been operated, the system control unit 109 advances to step S209. When the system control unit 109 determines that the assignable button has not been operated, the system control unit 109 advances to step S213.

In step S209, the system control unit 109 determines whether or not a preset is assigned to the assignable button. When the system control unit 109 determines that a preset is assigned to the assignable button, the system control unit 109 advances to step S210. When the system control unit 109 determines that a preset is not assigned to the assignable button, the system control unit 109 advances to step S213.

In step S210, the system control unit 109 determines whether or not the number of presets assigned to the assignable button is one. When the system control unit 109 determines that the number of presets assigned to the assignable button is one, the system control unit 109 advances to step S212. When the system control unit 109 determines that the number of presets assigned to the assignable button is two or more, the system control unit 109 advances to step S211.

Note that the system control unit 109 may determine whether or not the number of presets assigned to the assignable button is larger than a set value (for example, two) (whether or not a predetermined condition is satisfied). In addition, when the system control unit 109 determines that the number of presets assigned to the assignable button is equal to or smaller than the set value, the system control unit 109 may advance to step S212. When the system control unit 109 determines that the number of presets assigned to the assignable button is larger than the set value, the system control unit 109 may advance to step S211. The set value can be arbitrarily set (can be arbitrarily changed) by a user operation. In addition, when the system control unit 109 determines in step S209 that a preset is assigned to the assignable button without the processing of step S210 being performed, the system control unit 109 may advance to step S212.

In step S211, in accordance with the photographic setting presently applied to the digital camera 10, the system control unit 109 switches the photographic setting to be applied to the digital camera 10 to any of all presets assigned to the assignable button. Accordingly, the photographic setting to be applied to the digital camera 10 can be quickly switched to an appropriate photographic setting in accordance with the scene among all presets assigned by the user to the assignable button.

For example, let us assume a case where a first preset, a second preset, and a third preset are assigned to the assignable button. In this case, if a "photographic setting set to the digital camera 10 in advance" is applied to the digital camera 10, in step S211, the system control unit 109 switches the photographic setting to be applied to the digital camera 10 to the first preset. On the other hand, in this case, if the first preset is applied to the digital camera 10, in step S211, the system control unit 109 switches the photographic setting to be applied to the digital camera 10 to the second preset. In this case, if the second preset is applied to the digital camera 10, in step S211, the system control unit 109 switches the photographic setting to be applied to the digital camera 10 to the third preset. In this case, if the third preset is applied to the digital camera 10, in step S211, the system control unit 109 switches the photographic setting to be applied to the digital camera 10 to the first preset. In other words, every time the assignable button is operated (depressed) (every time a button operation is performed), the photographic setting to be applied to the digital camera 10 is sequentially switched among the three presets (the first preset, the second preset, and the third preset).

The "photographic setting set to the digital camera 10 in advance" is a photographic setting set by a method other than operating the assignable button. For example, the "photographic setting set to the digital camera 10 in advance" is a photographic setting (a present photographic setting) set by the user on a menu screen, an initial setting of the digital camera 10, or the like. Hereinafter, the "photographic setting set to the digital camera 10 in advance" will be referred to as a "camera setting".

In step S212, in accordance with the photographic setting applied to the digital camera 10, the system control unit 109 switches the photographic setting to be applied to the digital camera 10 to any of a plurality of photographic settings including the preset assigned to the assignable button and the camera setting. Accordingly, the user can quickly switch the photographic setting to be applied to the digital camera 10 to an appropriate photographic setting in accordance with the scene among the "camera setting" and the "at least one preset assigned to the assignable button". In addition, even when only one preset is assigned to the assignable button, the photographic setting to be applied to the digital camera 10 can be switched by an operation of the assignable button.

For example, let us assume a case where the first preset is assigned to the assignable button. In this case, if the camera setting is applied to the digital camera 10, in step S212, the system control unit 109 switches the photographic setting to be applied to the digital camera 10 to the first preset. On the other hand, in this case, if the first preset is applied to the digital camera 10, in step S211, the system control unit 109 switches the photographic setting to be applied to the digital camera 10 to the camera setting. In other words, every time the assignable button is operated (depressed), the photographic setting to be applied to the digital camera 10 is sequentially switched between the camera setting and the first preset.

In step S213, the system control unit 109 determines whether or not a change to the photographic setting has been requested from the user by a method other than an operation (other than a depression) of the assignable button. For example, when the user has performed an operation to change the photographic setting to be applied to the digital camera 10 on the menu screen, the system control unit 109 determines that a change to the photographic setting has been requested from the user. When the system control unit 109 determines that a change to the photographic setting has been requested, the system control unit 109 advances to step S214. When the system control unit 109 determines that a change to the photographic setting has not been requested, the system control unit 109 advances to step S202.

In step S214, the system control unit 109 determines whether or not the preset assigned to the assignable button is applied to the digital camera 10 (whether or not the preset is applied to the digital camera 10 by an operation of the assignable button). When the system control unit 109 determines that the preset assigned to the assignable button is applied to the digital camera 10, the system control unit 109 advances to step S202. When the system control unit 109 determines that the preset assigned to the assignable button is not applied to the digital camera 10, the system control unit 109 advances to step S215.

In step S215, the system control unit 109 changes the photographic setting to be applied to the digital camera 10 in accordance with contents of the request to change the photographic setting from the user (the request determined in step S213). Once the processing of step S215 is finished, the system control unit 109 advances to step S202.

In other words, according to steps S214 and S215, when the preset assigned to the assignable button is applied to the digital camera 10, the photographic setting applied to the digital camera 10 cannot be changed by a method other than operating (depressing) the assignable button. Therefore, for example, the content itself of the preset that is the photographic setting being applied to the digital camera 10 can be prevented from being changed by an unintended operation (request to change the photographic setting) by the user.

Figure 2:
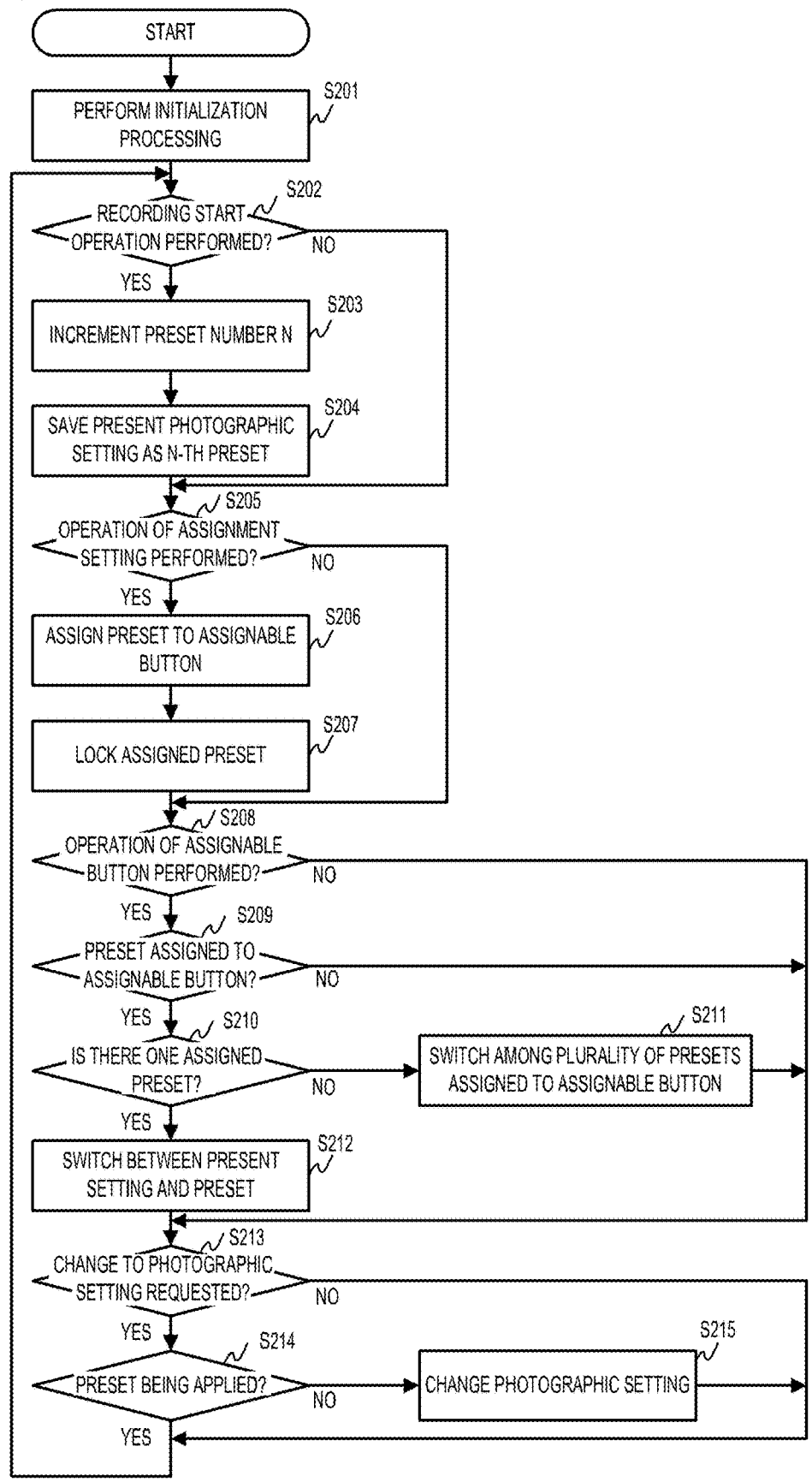
FIG. 2 is a flow chart showing an operation of a digital camera.

In the flow chart shown in FIG. 2, a case where the digital camera 10 has only one assignable button has been described. On the other hand, the processing represented by the flow chart shown in FIG. 2 can also be applied to cases where the digital camera 10 has a plurality of assignable buttons. In such a case, when any of the plurality of assignable buttons is operated, processing of steps S208 to S212 is performed with respect to the operated assignable button.

In addition, let us assume a case where the digital camera 10 has a first assignable button and a second assignable button, a first preset is assigned to the first assignable button, and a second preset is assigned to the second assignable button. In this case, even when the first preset is applied to the digital camera 10 by an operation of the first assignable button, the photographic setting to be applied to the digital camera 10 can be switched by an operation of the second assignable button (step S212). In other words, even when the first preset is applied to the digital camera 10 by an operation of the first assignable button, the system control unit 109 applies the camera setting or the second preset to the digital camera 10 in accordance with an operation of the second assignable button.

Figure 3A:
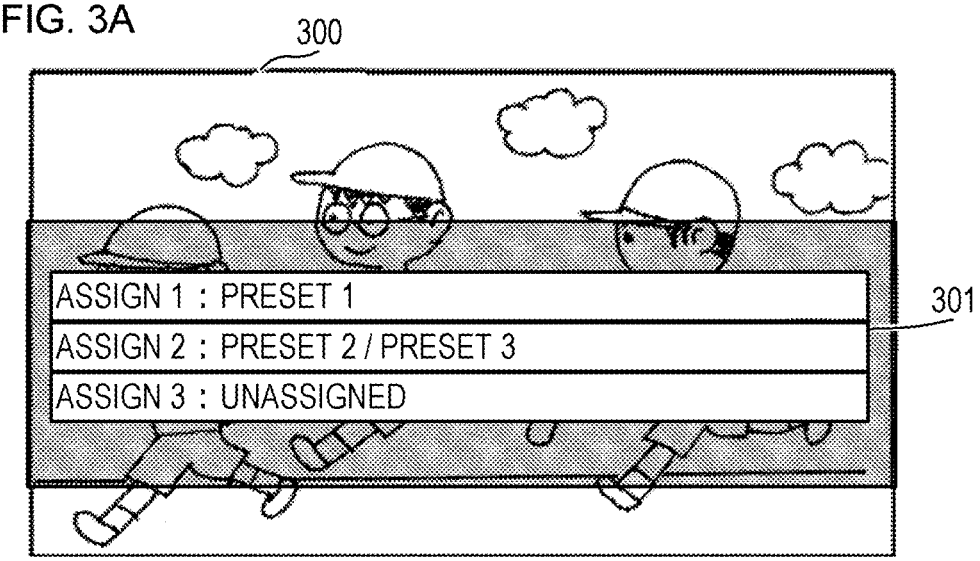
FIGS. 3A and 3B are diagrams illustrating a screen to be displayed on a display unit.
Figure 3B:
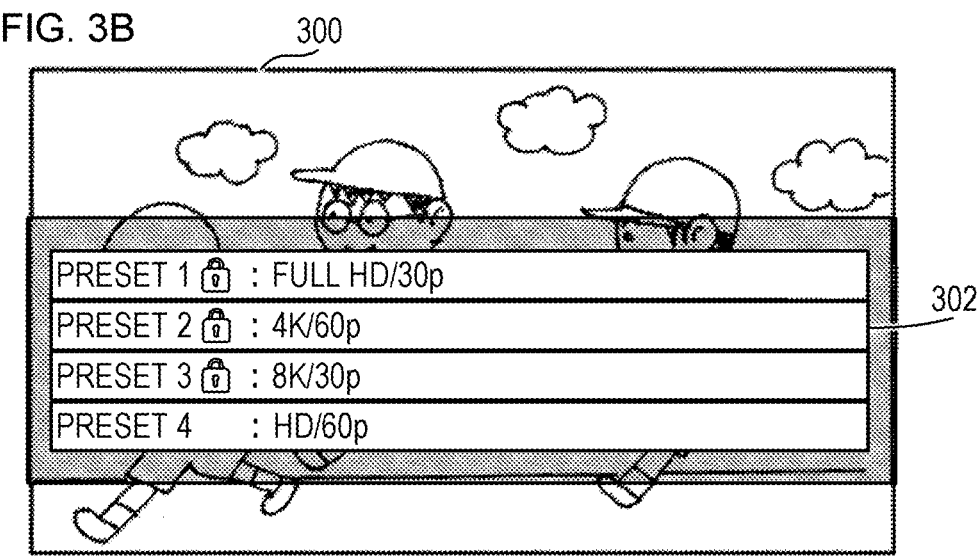

A screen to be displayed on the display unit 121 will be described with reference to FIGS. 3A and 3B. FIG. 3A is a display example of an assignment setting screen for assigning a preset to an assignable button. FIG. 3B is a display example of a preset screen for performing registration, editing, and the like of a preset.

FIG. 3A is a display example of an assignment setting screen for assigning a preset to each of three assignable buttons. A captured image 300 (an image of a subject being captured by the digital camera 10) and a setting screen 301 are displayed. On the setting screen 301 shown in FIG. 3A, a preset 1 is assigned to a first assignable button (item described as assign 1), and a preset 2 and a preset 3 are assigned to a second assignable button (item described as assign 2). On the other hand, no preset (neither of the presets) is assigned to the third assignable button (item described as assign 3).

FIG. 3B is a display example of a preset screen for registering a photographic setting including a resolution and a frame rate as a preset. The captured image 300 and a registration screen 302 for registering (setting) a preset are displayed. On the registration screen 302 shown in FIG. 3B, since the presets 1 to 3 are in a locked state, the presets 1 to 3 cannot be changed.

As described above, according to the present embodiment, by operating (depressing) an assignable button, the user can quickly switch (toggle) to one photographic setting among a plurality of photographic settings including photographic settings assigned to assignable buttons by the user in advance. Therefore, since the user can quickly change to an appropriate photographic setting when the scene changes, an imaging device that is less likely to miss out on photographic opportunities can be provided.

It should be noted that the various controls described above as controls to be performed by the system control unit 109 may be carried out by one piece of hardware or a plurality of pieces of hardware (for example, a plurality of processors or circuits) may control an entire apparatus by sharing processing steps.

According to the present invention, the possibility of a user missing out on photographic opportunities can be reduced.

In addition, while the present invention has been described in detail on the basis of a preferred embodiment thereof, it is to be understood that the present invention is not limited to the specific embodiment and that various modes that do not constitute departures from the gist of the invention are also included in the present invention. Furthermore, the embodiment described above simply represents one embodiment of the present invention and the embodiment can also be combined with other embodiments.

In addition, besides an imaging device (digital camera) main body, the present invention can also be applied to a control apparatus which remotely controls an imaging device (including a network camera) by communicating with the imaging device via wired or wireless communication. Examples of an apparatus which remotely controls an imaging device include a smartphone, a tablet PC, and a desktop PC. An imaging device can be remotely controlled by notifying the imaging device of commands for performing various operations and configuring settings from a control apparatus based on operations and processing performed by the control apparatus. Furthermore, the control apparatus may be configured to receive a live view image photographed by the imaging device via wired or wireless communication and to display the live view image.

In addition, "advance to step S1 when A is B or more but advance to step S2 when A is smaller (lower) than B" in the description presented above may be replaced with "advance to step S1 when A is larger (higher) than B but advance to step S2 when A is B or less". Conversely, "advance to step S1 when A is larger (higher) than B but advance to step S2 when A is B or less" may be replaced with "advance to step S1 when A is B or more but advance to step S2 when A is smaller (lower) than B". Therefore, unless an inconsistency arises, the expression "A or more" may be replaced with "A or larger (higher; longer; more) than A" or replaced with "larger (higher; longer; more) than A". On the other hand, the expression "A or less" may be replaced with "A or smaller (lower; shorter; less) than A" or replaced with "smaller (lower; shorter; less) than A". In addition, "larger (higher; longer; more) than A" may be replaced with "A or more" and "smaller (lower; shorter; less) than A" may be replaced with "A or less".

While the present invention has been described in detail on the basis of preferred embodiments thereof, the present invention is not limited to the specific embodiments and various modes without departing from the scope of the invention are also included in the present invention. Parts of the embodiments described above may be appropriately combined with each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-181608, filed on Nov. 14, 2022, which is hereby incorporated by reference herein in its entirety.

What is claimed is:

1. An imaging device, comprising:
a first button; and
at least one memory and at least one processor which function as:
a storing unit configured to store, in accordance with an instruction to record an image, a photographic setting of the imaging device during recording as a preset of the photographic setting, the storing unit being capable of storing a plurality of presets of photographic settings;
an assigning unit configured to assign, in accordance with a user operation, at least one of the plurality of photographic settings stored as presets to the first button, the assigning unit being capable of assigning the plurality of presets to the first button;
a control unit configured to (1) in a case where a number of presets assigned to the first button does not satisfy a predetermined condition, control so as to switch the photographic setting to be applied to the imaging device, each time the first button is depressed, between a photographic setting set to the imaging device before the first button is operated and the preset of the photographic setting assigned to the first button, and (2) in a case where the number of presets assigned to the first button satisfies the predetermined condition, control so as to switch the photographic setting to be applied to the imaging device, each time the first button is depressed, among the plurality of presets assigned to the first button, and further control so as not to switch to a photographic setting that was set to the imaging device before the first button is operated, in response to depression of the first button.

2. The imaging device according to claim 1, wherein the predetermined condition is where the plurality of presets assigned to the first button includes two or more presets.

3. The imaging device according to claim 1, wherein the:
control unit is further configured to set a preset assigned to the first button to a state where a change is not possible.

4. The imaging device according to claim 1, wherein the control unit is further configured to, in a first case where the photographic setting to be applied to the imaging device is switched by a depression of the first button to one of the presets assigned to the first button, control the imaging device so that the photographic setting to be applied to the imaging device is not changeable by a method other than a depression of the first button.

5. The imaging device according to claim 4, wherein the assigning unit assigns at least one preset stored by the storing unit to each of the first button and a second button in accordance with a user operation, and
the control unit switches the photographic setting to be applied to the imaging device to any photographic setting from among a plurality of photographic settings including a photographic setting set to the imaging device and the preset assigned to the second button in response to depressing of the second button.

6. The imaging device according to claim 1, wherein the photographic setting includes at least one setting among an exposure, an ISO sensitivity, a white balance, a presence/absence of automatic focusing, a resolution, a frame rate, an operating mode, a presence/absence of flash photography, and a presence/absence of subject tracking.

7. A control method of an imaging device including a first button, the control method comprising:
storing, in accordance with an instruction to record an image, a photographic setting of the imaging device during recording as a preset of the photographic setting, wherein a plurality of presets of photographic settings can be stored;
assigning, in accordance with a user operation, at least one of the plurality of photographic settings stored as presets to the first button, wherein the plurality of presets can be assigned to the first button;
determining that the first button is depressed, and
controlling (1) in a case where a number of presets assigned to the first button does not satisfy a predetermined condition, so as to switch the photographic setting to be applied to the imaging device, each time the first button is depressed, between a photographic setting set to the imaging device before the first button is operated and the preset of the photographic setting assigned to the first button, and (2) in a case where the number of presets assigned to the first button satisfies the predetermined condition, so as to switch the photographic setting to be applied to the imaging device, each time the first button is depressed, among the plurality of presets assigned to the first button, and further control so as not to switch to a photographic setting that was set to the imaging device before the first button is operated, in response to depression of the first button.

8. A non-transitory computer readable medium that stores a program, wherein the program causes a computer to execute a control method of an imaging device including a first button, the control method comprising:
storing, in accordance with an instruction to record an image, a photographic setting of the imaging device during recording as a preset of the photographic setting, wherein a plurality of presets of photographic settings can be stored;
assigning, in accordance with a user operation, at least one of the plurality of photographic settings stored as presets to the first button, wherein the plurality of presets can be assigned to the first button;
determining that the first button is depressed, and
controlling (1) in a case where a number of presets assigned to the first button does not satisfy a predetermined condition, so as to switch the photographic setting to be applied to the imaging device, each time the first button is depressed, between a photographic setting set to the imaging device before the first button is operated and the preset of the photographic setting assigned to the first button, and (2) in a case where the number of presets assigned to the first button satisfies the predetermined condition, so as to switch the photographic setting to be applied to the imaging device, each time the first button is depressed, among the plurality of presets assigned to the first button, and further control so as not to switch to a photographic setting that was set to the imaging device before the first button is operated, in response to depression of the first button.

* * * * *